United States Patent [19]

Otto et al.

[11] Patent Number: 4,797,531

[45] Date of Patent: Jan. 10, 1989

[54] CUTTING PRESS

[75] Inventors: Gerhard Otto, Alfeld; Manfred Rohrbach, Hildesheim; Gerald Leupold, Alfeld, all of Fed. Rep. of Germany

[73] Assignee: C. Behrens AG, Alfeld, Fed. Rep. of Germany

[21] Appl. No.: 94,528

[22] Filed: Sep. 8, 1987

[30] Foreign Application Priority Data

Oct. 31, 1986 [DE] Fed. Rep. of Germany ....... 3637204

[51] Int. Cl.⁴ ............................................. B23K 26/00
[52] U.S. Cl. ............................. 219/121.67; 219/121.82
[58] Field of Search ................ 219/121 LG, 121 LN, 219/121 LY, 121 EH, 121 EX, 121 LL, 79, 93

[56] References Cited

U.S. PATENT DOCUMENTS 4,328,411 5/1982 Haller et al. .............. 219/121 LG X
4,609,805 9/1986 Tobita et al. ........................... 219/93
4,716,268 12/1987 Wacker .............................. 219/79 X

FOREIGN PATENT DOCUMENTS

0104286 6/1984 Japan ............................. 219/121 LL

Primary Examiner—C. L. Albritton
Attorney, Agent, or Firm—Michael J. Striker

[57] ABSTRACT

A cutting press for working plate-shaped workpieces comprises at least one working station in which a workpiece having a working place is supported and in which a part of the workpiece is to be cut out, a device for cutting out the part of the workpiece, and a device for releasing the cutout part of the workpiece from the plane of the workpiece for removing the cutout part from the working station, the releasing device including substantially a structural element which is movable in a working region of the working station in a motorized manner and shaped to release the cutout part from the workpiece.

32 Claims, 8 Drawing Sheets

CUTTING PRESS

BACKGROUND OF THE INVENTION

The present invention relates to a cutting press. More particularly, it relates to a cutting press for working plate-shaped workpieces, such as automatically operating metal sheet working machines, particularly numerically controlled revolving metal presses.

In cutting presses of the abovementioned general type it is known to provide a workpiece supply and a withdrawal of the worked workpiece automatically. The withdrawal is performed for example by a tiltable machine table segment or openable machine table region in connection with conveyor bands. The use of laser systems as devices for performing very accurate cutting steps has led to certain problems, since because of the narrow separating joint between the cut sheet parts, a release of the parts which had been cut out in this manner required the utilization of special extracting devices.

It is known to arrange such extracting devices outside the working region of the cutting press. The workpiece which includes the cut out sheet part, must be moved for example by means of a coordinate table, out of the working space of the cutting press and into the working region of the extracting device which always cooperates with an opening of the machine table for withdrawing the extracted part.

It has been determined that in these known cutting presses it is, however, always problematic to withdraw small and relatively thin cut out parts, since during the transporting movement of the workpiece over the machine table these parts remain hanging or are damaged by warping.

SUMMARY OF THE INVENTION

Accordingly, it is an object of the present invention to provide a cutting press which avoids the disadvantages of the prior art.

More particularly, it is an object of the present invention to provide a cutting press which allows withdrawing of small and thin cutout parts in a reliable and simple manner.

In keeping with these objects and with others which will become apparent hereinafter, one feature of the present invention resides, briefly stated, in a cutting press in which a device for releasing a cutout part from a workpiece for withdrawing the cutout part from a working region is formed substantially as a structural element which is movable in the working region in a motorized manner and shaped for releasing the cutout part from the workpiece.

What is important in the inventive construction of the cutting press is that for performing the release of the cutout part from the workpiece, the workpiece must not move out of the working region, so that this releasing step can take place in the working region itself. In deviation from known cutting presses, the extracting device can thereby move in the working region of the cutting press. The extracting device is substantially composed of a structural element which can be designed for example so that it applies a mechanical pressure against the workpiece, whereby as a result, these parts can fall down from the workpiece. This of course requires the availability of an opening in a workpiece support. The aforementioned structural element is movable in a motorized manner at least between a working position inside the abovementioned working region and an inoperative position outside the working region. The location of the inoperative position can be determined as desired. The withdrawal of the released parts can be carried in a known manner. The inventive cutting press provides for significant advantages especially for working of very small and thin parts to be cut out, since these parts can be removed immediately after the cutting step.

In accordance with another advantageous feature of the present invention, the abovementioned structural element of the releasing means is formed as an extracting plate which is provided on its lower side for example with displacement bodies. The displacement bodies are elastically compressed in the moment of placing onto the workpiece, and under the action of the elastic forces the cutout part of the workpiece is pressed for example downwardly from the workpiece.

In accordance with still another feature of the present invention, the abovementioned structural element or extracting plate in its inoperative position does not hinder the working region in which the movement of the structurral element or the extracting plate takes place. This working region remains always accessible for inspections. Thereby the inventive releasing device does not affect the cutting press with respect to its conventional operation.

In accordance with a further feature of the present invention, the drive system for the releasing means is designed so that the lowering and rotation of the releasing means are carried out within definite limits. The lifting and rotary drives which are required for this purpose can be designed in any manner. For providing a favorable switching of the sequence of the respective movements, the extracting plate can be arranged eccentrically on a rod and rotate in such a vertical position in which it is located laterally near the working region of the press, for example, near the C-shaped base frame of the press. For practical reasons, the rod can be arranged as close as possible near the working region. By the switching connection of the opening or closing of the opening provided in the machine table for lowering of the extracting plate, a certain degree of automation of the process of releasing of the cutout part is provided. The switching connection can also be executed in any way.

In accordance with still a further feature of the present invention, the transferring of the extracting plate from the inoperative position to its working position is always maintained within a predetermined movement process, since during the rotary movement the lifting movement cannot be performed simultaneously. Since the control functions are produced from the reaching of the respective end positions of the rotary drive, the switching devices can be formed for example as simple end switches. By means of the end switches, the arresting device is controlled between two limiting conditions, namely one condition in which the vertical movement of the rod is blocked and another condition in which the vertical movement of the rod is released.

The withdrawal of fine or thin parts is connected with the above described problems which are especially pronounced in connection with the laser systems used for cutting of plate-shaped workpieces. The reason is that the laser systems can produce very accurate cuts and thereby cutting of very small parts. The inventive device does not interfere with the laser system, especially since the opening which serves for the withdrawal of the cutout parts is formed by the edge of the laser shaft which is arranged movably relative to the plane of the machine table.

The novel features which are considered as characteristic for the invention are set forth in particular in the appended claims. The invention, itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
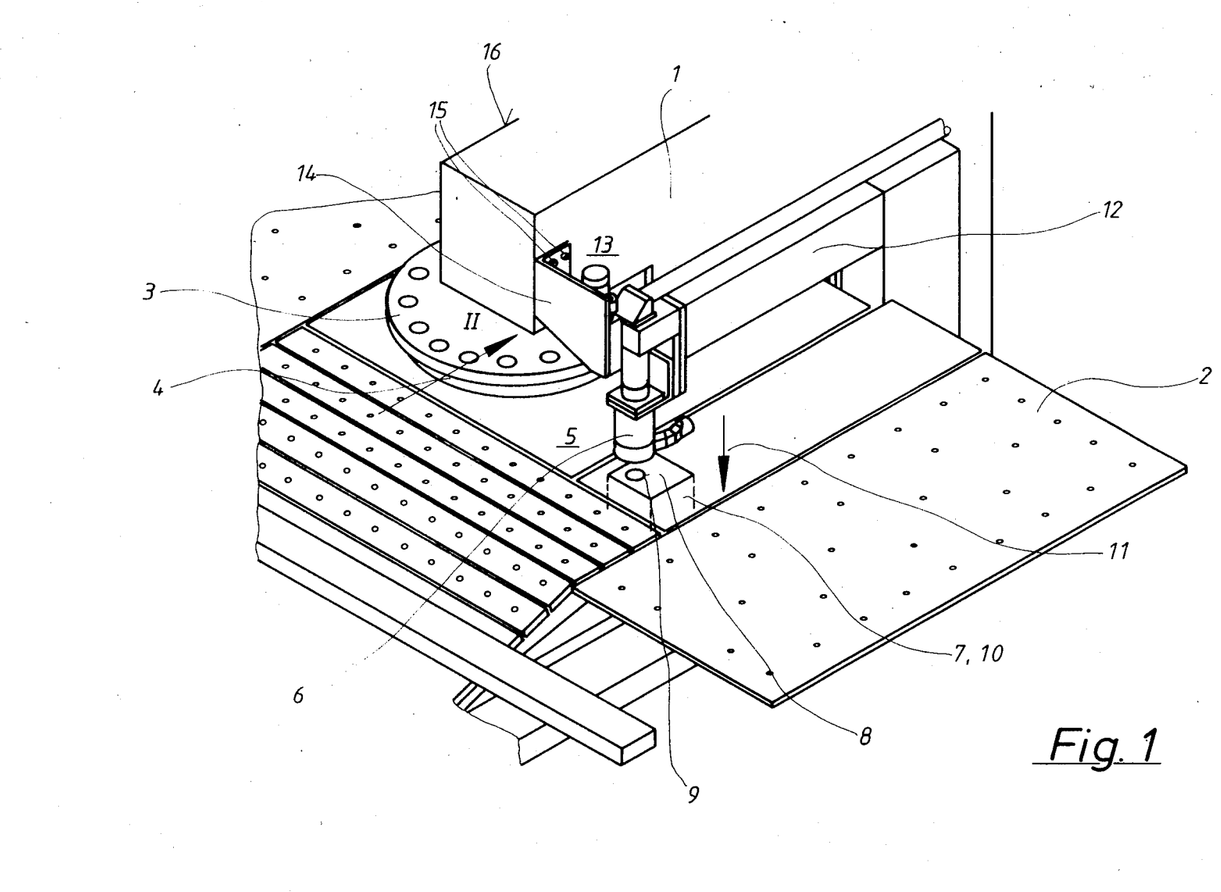
FIG. 1 is a perspective view of the revolving cutting press with an extracting device in accordance with the present invention.

A revolving cutting press in accordance with the present invention as shown in a perspective view of FIG. 1 has a C-shaped base frame 1 which cooperates with a coordinate table 2. The base frame 1 serves in a known manner for supporting of revolving plates 3 and 4 which are located over one another. The revolving plates are arranged for receiving a plurality of tool sets in the peripheral region. The coordinate table 2 is provided with not shown devices for two-dimensional displacement of plate-shaped tools relative to a not shown working station of the press. In the working station, as known in the art, two sets are coupled with a plunger drive and composed of at least one punch in the upper revolving plate and at least one matrix in the lower revolving plate, for carrying out of punching steps.

The revolving cutting press of the invention is provided in the present case with a laser station 5 for carrying out of cutting steps which must be performed with a workpiece to be worked. The laser station 5 includes substantially a laser head 6 and a laser shaft 7. The latter is closed at the upperside by a plate 8 to an opening 9. The upper side of the plate 8 is located in the plane of the coordinate table 2. The laser shaft 7 which is composed of the plate 8 and side walls 10 is arranged on the coordinate table 2 so that it is lowerable in a motor-operated manner in direction of the arrow 11, so that the upper side of the plate 8 can be displaced under the plane of the coordinate table 2. The structural elements for displacing of the laser shaft 7 is not shown and basically it can be executed in any desirable manner.

The laser head 6, in addition to its own accessories is mounted on an arm 12 which extends in the horizontal direction above the coordinate table 2 and is arranged on a floor near the base frame of the revolving cutting press in a not shown manner. The laser arrangement is not germane to the present invention and can be formed as any laser system which is conventional for metal cutting.

The revolving cutting press is provided with an extracting device which is identified with reference numeral 13. It is supported on a holding member 14 which is formed as an angular part or the like. The holding member 14 is mounted by means of screws 15 on an upper horizontally extending leg 16 of the C-shaped base frame of the revolving cutting press and extends laterally forwardly thereof. The abovementioned arm 12 extends parallel to the leg 16, but at a certain distance from it. The lateral extension of the holding member 14 is dimensioned so that it reaches the vicinity of the laser station 5.

The structural elements of the revolving cutting press shown in FIGS. 2–5 and coinciding with those of FIG. 1 are identified with the same reference numerals for preventing repetitions of description.

Figure 2:
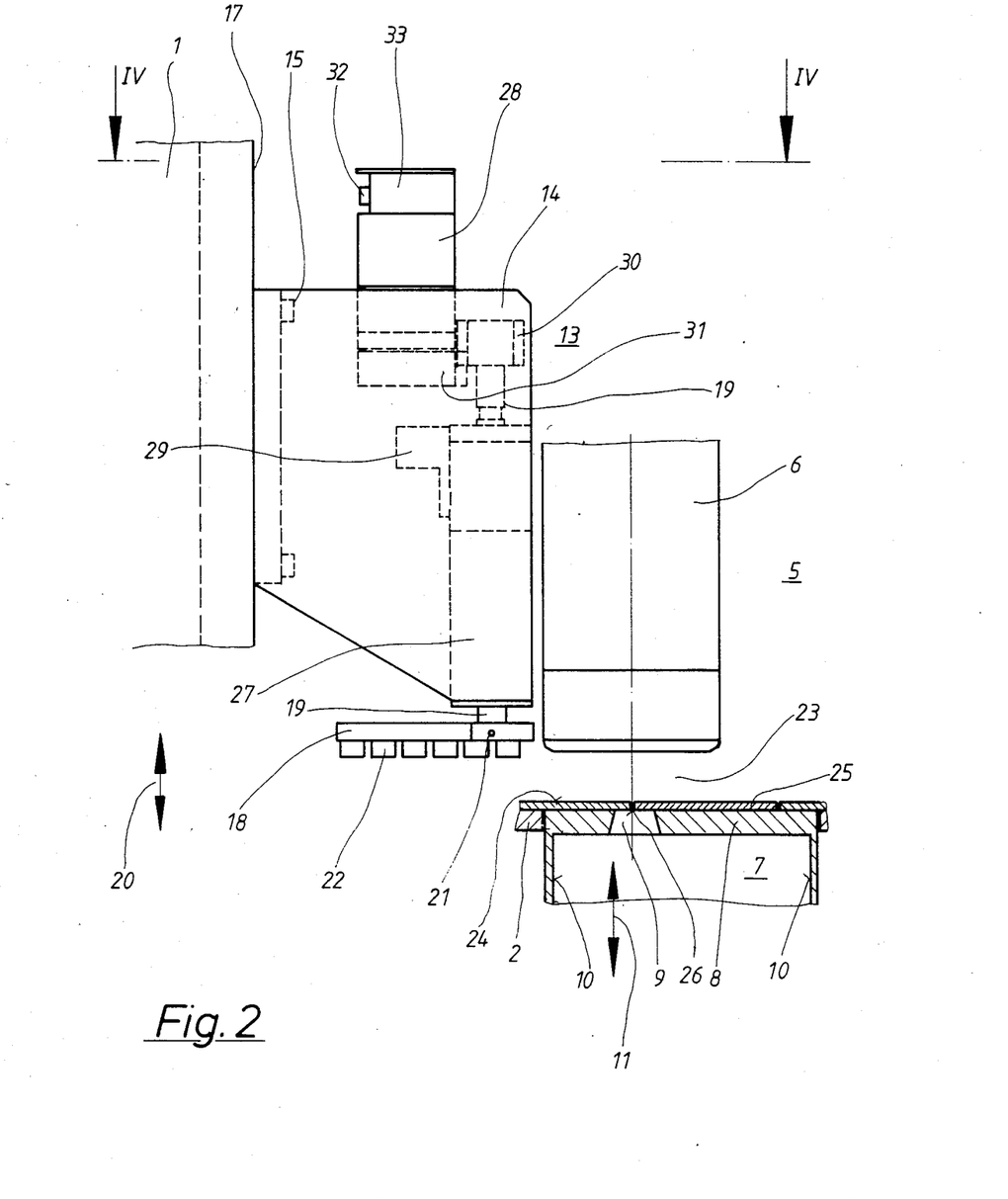
FIG. 2 is a side view of the extracting device in accordance with the present invention.

The holding member 14 which is mounted on a side wall 17 of the base frame 1 as shown in FIG. 2, serves for mounting the inventive extracting device 13. By means of the extracting device, an extracting plate 18 which is mounted on a rod 19 is both movable vertically in direction of the arrow 20 and rotatable about an axis of the rod 19. A pin 21 is used for mounting of the extracting plate 18 on the rod 19.

The extracting plate 18 carries on its lower side a plurality of displacement bodies 22. The displacement bodies can be composed of an elastic material for example of foam plastic, rubber and the like, and also can be formed as wire bristles. The geometrical design of the displacement bodies 22 arranged on the lower side of the extracting plate 18 is arbitrary. Their operation and mode of action within the present invention will be explained in detail hereinbelow.

As can be seen from FIG. 2, the extracting plate 18 is not formed or arranged in a rotation-symmetrical manner. Therefore, because of the rotary-fixed mounting of the extracting plate 18 on the rod 19 by means of the pin 21, the extracting plate 18 after lowering and turning can be turned about the axis of the rod 19 in an intermediate space 23 between the laser head 8 and the laser shaft 7. The extracting plate 18 is dimensioned and arranged so that the upper surface of the laser shaft 7, especially the plate 8, can be substantially overlapped by the extracting plate 8.

A workpiece, namely a sheet or a plate, is identified with reference numeral 24. In the laser station 5, a part 25 which is delimited by a cut 26 is cut out from the workpiece 24. The way of removing of this part 25 will be explained in detail hereinbelow.

The actuation of the extracting plate 18 or the rod 19 is performed by a pressure medium, in the present case pneumatically. A vertical lifting cylinder-piston unit 27 is used for a vertical displacement, a rotary cylinder-piston unit 28 is used for rotary movement about the axis of the rod 19, and an arresting cylinder-piston unit 29 is used for arresting of the rod 19 with respect to a movement in vertical direction. The lifting cylinder-piston unit 27 and the rotary cylinder-piston unit 28 are mounted in a not shown manner on the holding member 14, while the arresting cylinder-piston unit 29 is mounted on the lifting cylinder-piston unit 27. The rod 19 extends through the whole lifting cylinder-piston unit 27 and carries a pinion 30 at its end which faces away of the extracting plate 18. The pinion 30 extends in an axial direction with consideration of the maximum possible stroke of the rod 19 so that in each axial position a reliable engagement of the pinion 30 with a toothed segment 31 is provided.

An abutment arm is identified with reference numeral 32, and a cover sheet is identified with reference numeral 33. The exact support and operation of the abutment arm 32 which is arranged on the shaft of the rotary cylinder-piston unit 28 will be explained hereinbelow.

Figure 3:
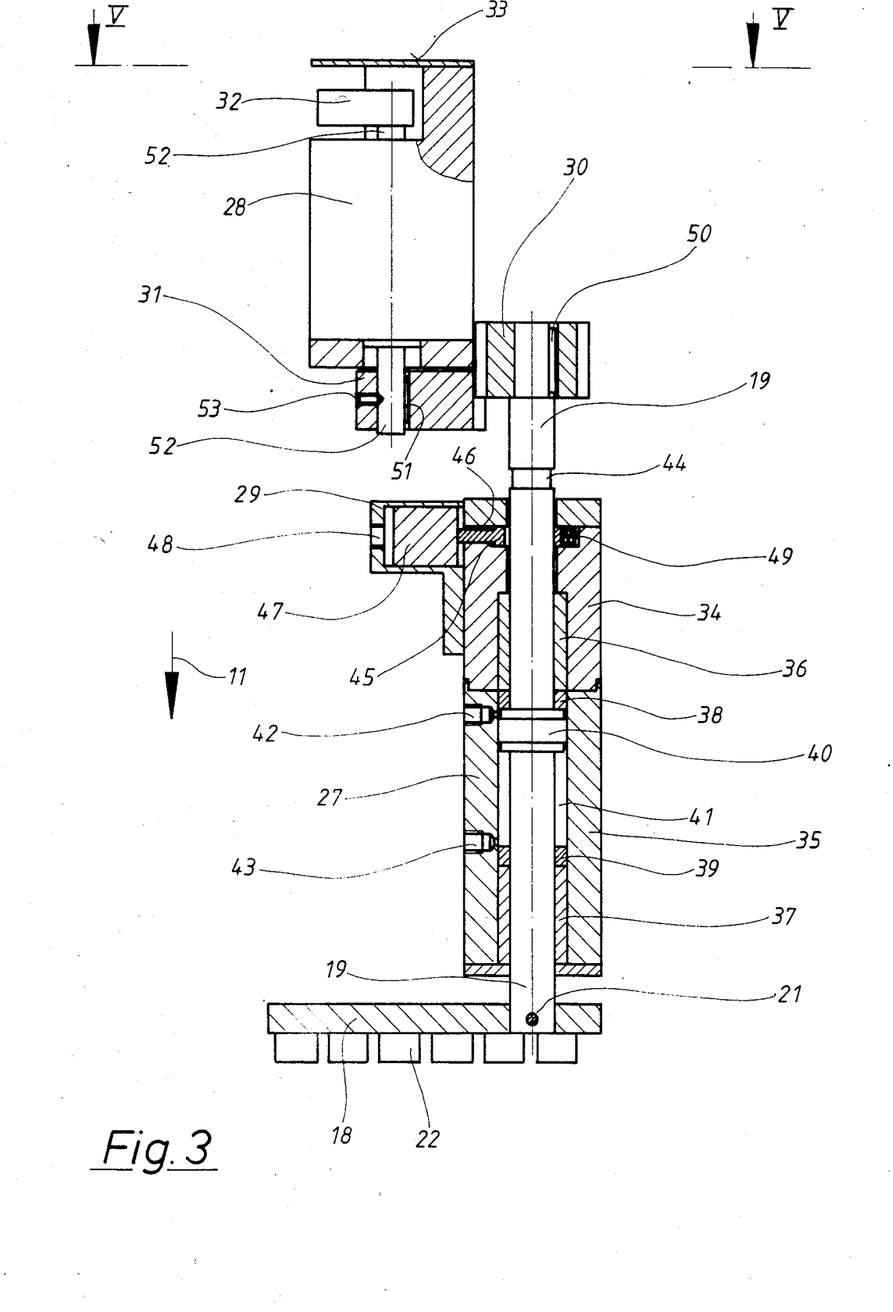
FIG. 3 is a partial longitudinal section of the extracting device in accordance with the present invention.

As can be seen from FIG. 3, the lifting cylinder-piston unit 27 is substantially composed of two cylinder bodies 34 and 35. A piston 40 mounted on the rod 19 is movable in a cylinder formed by the cylinder bodies 34 and 35. The vertical stroke of the piston 40 is limited by bushes 36 and 37 in connection with abutment rings 38 and 39. Working chambers 41 of the cylinder communicate in the respective end regions with connecting openings 42 and 43 for a pressure medium, which is here pressure air. The rod 19 is provided in its upper region with a circumferential groove 44, which cooperates with an arresting member 45.

The arresting member 45 is slidingly received in a recess 46 of a cylinder member 34, the recess extending perpendicularly to the axis of rod 19. The arresting member 45 forms a structural unit with the piston rod of the piston 47 of the arresting cylinder-piston unit 29. A connecting opening of the arresting cylinder-piston unit 29 is identified with reference numeral 48. It is used for supplying a pressure medium, here pressure air. The arresting member 46 cooperates simultaneously with a return spring 49 which is supported in a respective opening of the cylinder body 34 and acts upon the arresting member 45 so that in a pressureless condition of the arresting cylinder-piston unit 29, the arresting member 45 is pressed against the rod 19 and thereby brought in engagement with the groove. Thereby, in pressureless condition of the arresting cylinder-piston unit 29, the vertical movement of the rod 19 is blocked by the arresting member 45.

An adjusting spring 51 guarantees a rotation-fixed mounting of the toothed segment 31 on a shaft 52 of the rotary cylinder-piston unit 28. The mounting of the toothed segment 31 on the shaft 52 is moreover carried by means of a threaded pin 53. The rotary cylinder-piston unit 28 can be formed as a conventional operating element provided with pressure medium connections for forward and rearward running. Therefore its detailed description is dispensed with.

Figure 4:
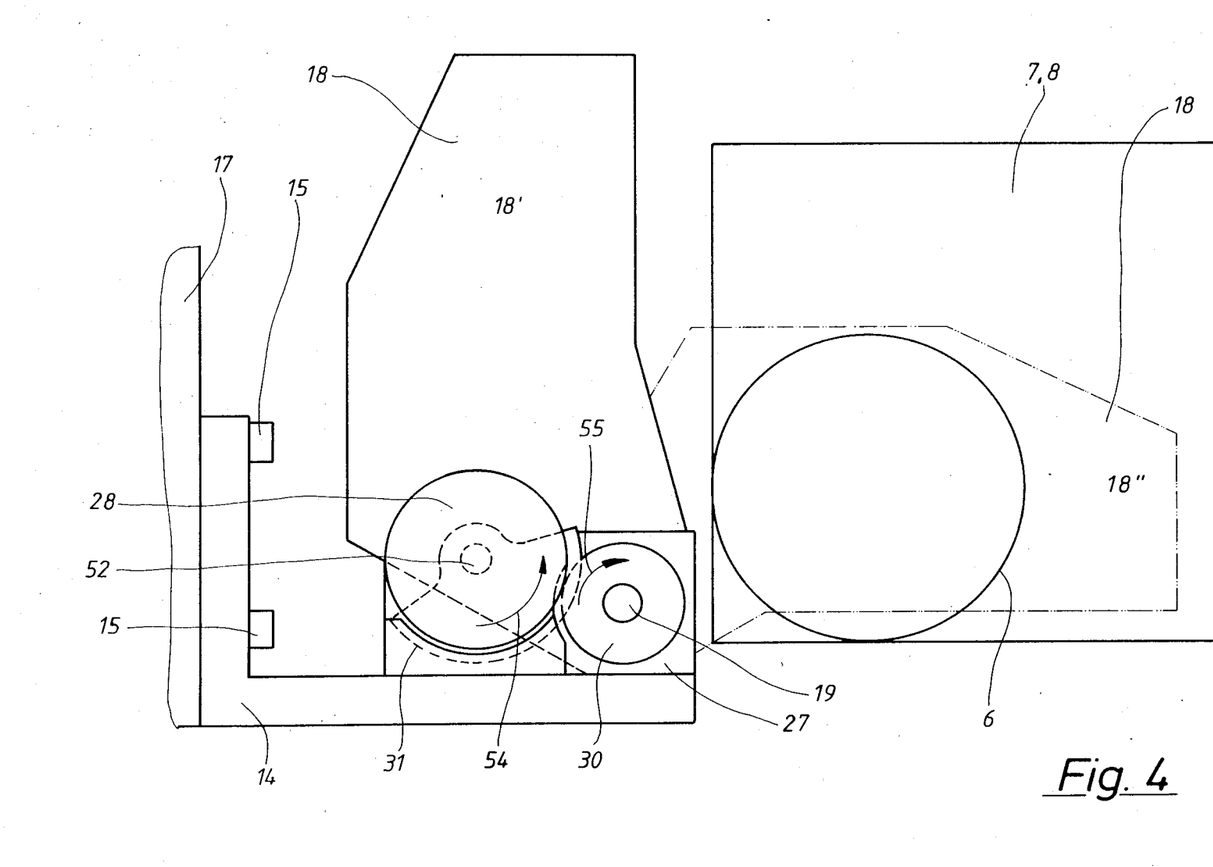
FIG. 4 is a plan view of the extracting device in a plane IV—IV of FIG. 2.

FIG. 4 shows a plan view which illustrates a rotation of the shaft 52 of the rotary cylinder-piston unit 28 in direction of the arrow 54 by means of the toothed segment 31, so that the pinion 30 and thereby the extracting plate 18 move from a position 18' to a position 18" and thereby is rotated by an angle of approximately 90° in a horizontal plane. Electrical or electronic switching devices which determine the end of rotary movement of the shaft 62 of the rotary cylinder-piston unit 28 are not shown in the drawings.

Figure 5:
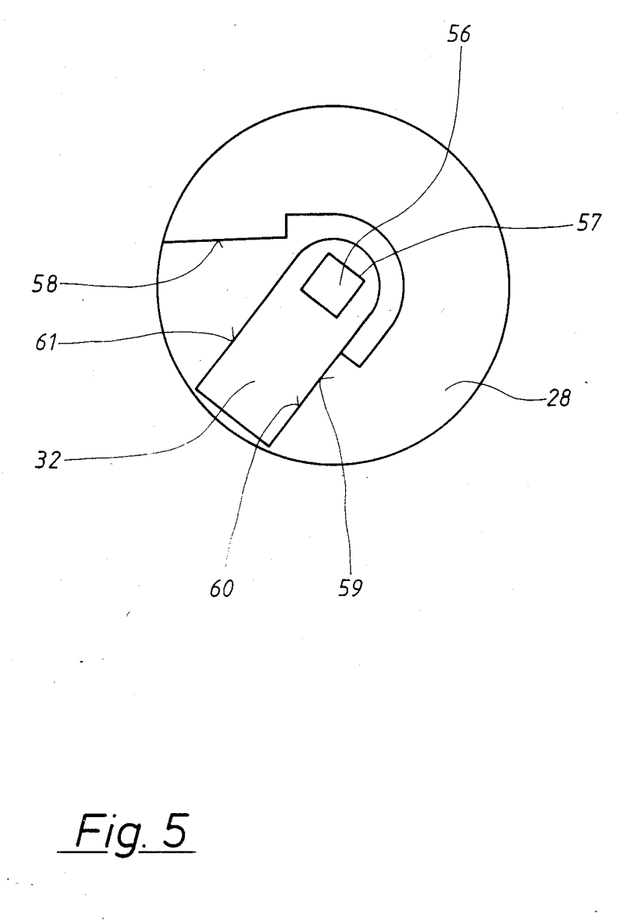
FIG. 5 is a plan view of a rotary drive in a plane V—V of FIG. 3.

As can be seen from FIG. 5, the end of the shaft 52 which extends beyond the upper side of the lifting cylinder-piston unit 28 ends in a four-cornered profile 56 which is inserted in a respective four-cornered recess 57 of the arm 32. The housing of the rotary cylinder-piston unit 28 forms abutment surfaces 58 and 59 in the region of the arm 32. The respective planes of the abutment surfaces 58 and 59 extend relative to one another at an angle which determines the rotary angle of the shaft 52 of the rotary cylinder-piston unit 28. The abutment arm which is substantially parallelpiped-shaped has limiting surfaces 60 and 61 which extend symmetrically and parallel to a plane extending through the rotary point of the arm 32. The abovementioned abutment surfaces 58 and 59 are arranged so that in contacting condition, the respective limiting surfaces extend parallel to these abutment surfaces. FIG. 5 shows the working position of the inventive extracting device 13 in which the extracting plate 18 is located in the intermediate space 23 and the limiting surface 60 abuts against the abutment surface 59.

The operation of the inventive extracting device 13 will be shortly discussed hereinbelow, and particularly in connection with FIGS. 2 and 3.

The starting point is that the cut 26 inside the workpiece 24 is fully completed, so that the part 25 is cut out around it. In this phase the laser shaft 7 is located in its upper position in which its upper side, namely the plate 8 lies in the plane of the coordinate table 2. Moreover, the extracting device in this phase is located in its lifted inoperative position shown in FIG. 2. This inoperative position is characterized in that the extracting plate 18 is not only lifted, but also turned from the working region of the laser station 5 by rotation about the axis of the rod 19. In this inoperative position the groove 44 is located above the position of the arresting member 45, and simultaneously the arresting cylinder-piston unit 29 is pressureless. A rotary movement of the rod 19 is blocked in the inoperative position by means of the piston 30 which engages with the toothed segment 31 whose rotation is blocked by means of the rotary cylinder-piston unit 28 in a pneumatic manner. Also, the piston 4 can be held in its lifted position in a pneumatic manner, for example, by the pressure application in the connecting opening 43.

In this phase the extraction step is carried out so that first the connecting opening 42 is loaded with a higher pressure than in the connecting opening 43 so that the piston 40 and the rod 19 with the extracting plate mounted thereon are moved downwardly in direction of the arrow 11. The arresting member 45 engages into the groove 44 under the action of the return spring 49, as long as the height of the recess 46 is reached. At this point, the further downward movement is blocked.

The arrangement of the extracting device 13 relative to the intermediate space 23 is so measured in connection with the position of the groove 44, that in this arresting condition of the arresting member 46 the rotary movement is transferred to the rod 19 by means of the rotary cylinder-piston unit 28. Thereby the extracting plate 18 is turned into the intermediate space 23 between the laser head 6 and the laser shaft 7. This turning movement can be automatically connected with the arresting of the arresting member 46 in electrical, pneumatic or mechanical way. The required switching members which are needed for this purpose are not shown for the reason of clarity of the drawings.

The end of the rotary movement of the rod 19 and thereby the extracting plate 18 is also determined by suitable electrical, electronic or similar switching elements. In dependence upon their switching condition, the arresting cylinder-piston unit 29 is loaded with pressure via the connecting opening 48, so that the arresting is released against the action of the return spring 49. Under the action of the pressure which is transferred via the connecting opening 42 to the lifting cylinder-piston unit 27, a further downward movement of the extracting plate 18 takes place. The displacement body 22 abuts against the workpiece and is elastically compressed. As long as the piston 40 reaches its lowest position, an automatic lowering of the laser shaft 7 takes place. Because of the elastic forces of the displacement bodies 22, the part 25 of the workpiece 24 is pressed out and transported in any manner from the working region of the cutting press. Transporting mechanisms which are needed for this purpose are not shown in the drawing. The motor-operated process of lowering the laser shaft 7 can also be connected with the reaching of the lowest position of the piston 40 in electrical, electronic or similar manner.

The vertical stroke path of the laser shaft corresponds at least to the maximum permissible thickness of the workpiece 24.

After transporting of the cutout part 24 and reaching the lowest position by the laser shaft, the extracting step reaches its end, and after this the connecting opening 43 is loaded with pressure so that the piston 40 moves upwardly in the direction which is opposite to the arrow 11. In this first movement phase, the arresting cylinder-piston unit 29 is pressureless, so that the arresting member 45 can be engaged with reaching of the groove 44. A control signal is produced from this arresting position for the rotary cylinder-piston unit 28, and thereby the extracting plate 18 is turned out from the intermediate space 23, namely the working region of the laser station 5. At the end of this rotary movement, a control signal is supplied, after this the arresting is released by pressure loading of the arresting cylinder-piston unit 29, and finally the further upward movement of the extracting plate 18 takes place til it reaches the position shown in FIG. 2. In this upper inoperative position, the arresting cylinder-piston unit 29 is switched to be pressureless.

Figure 6:
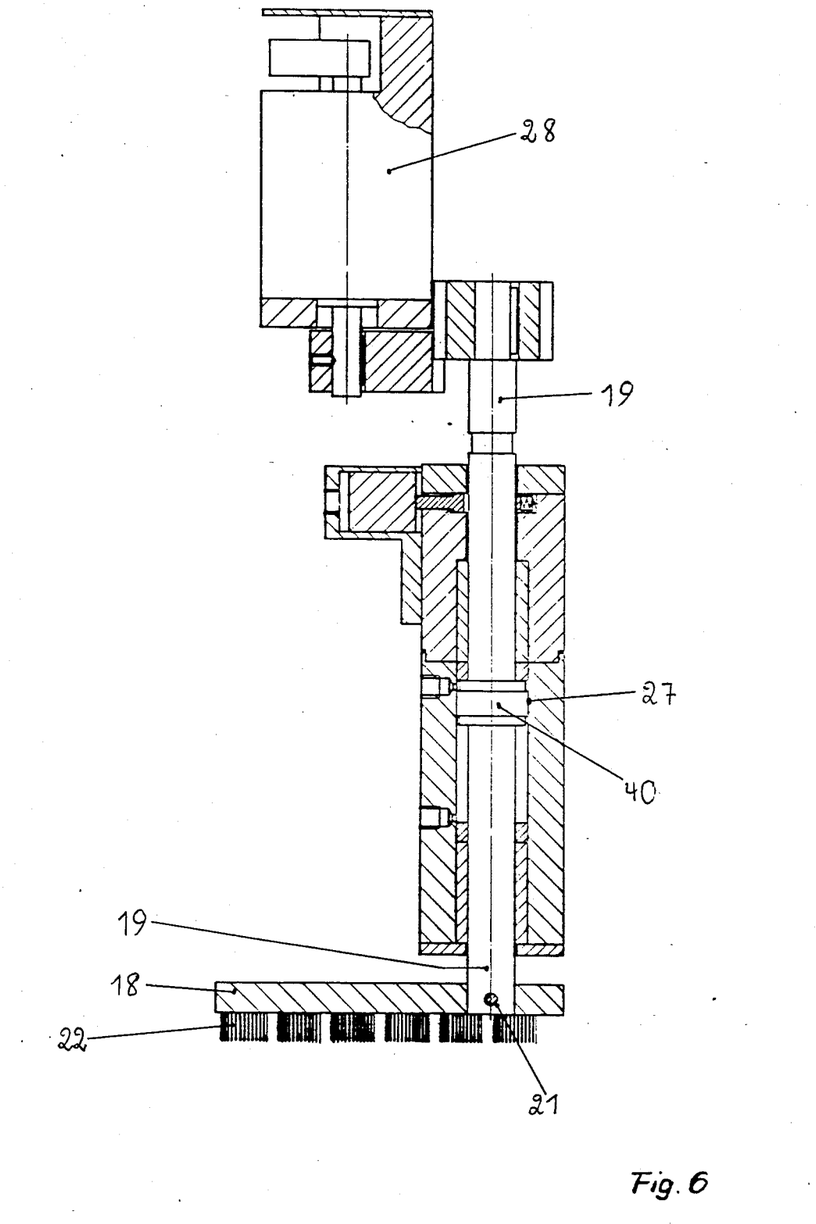
FIG. 6 is a side view of the extracting device in accordance with the present invention, with displacement bodies formed as wire bristles.
Figure 7:
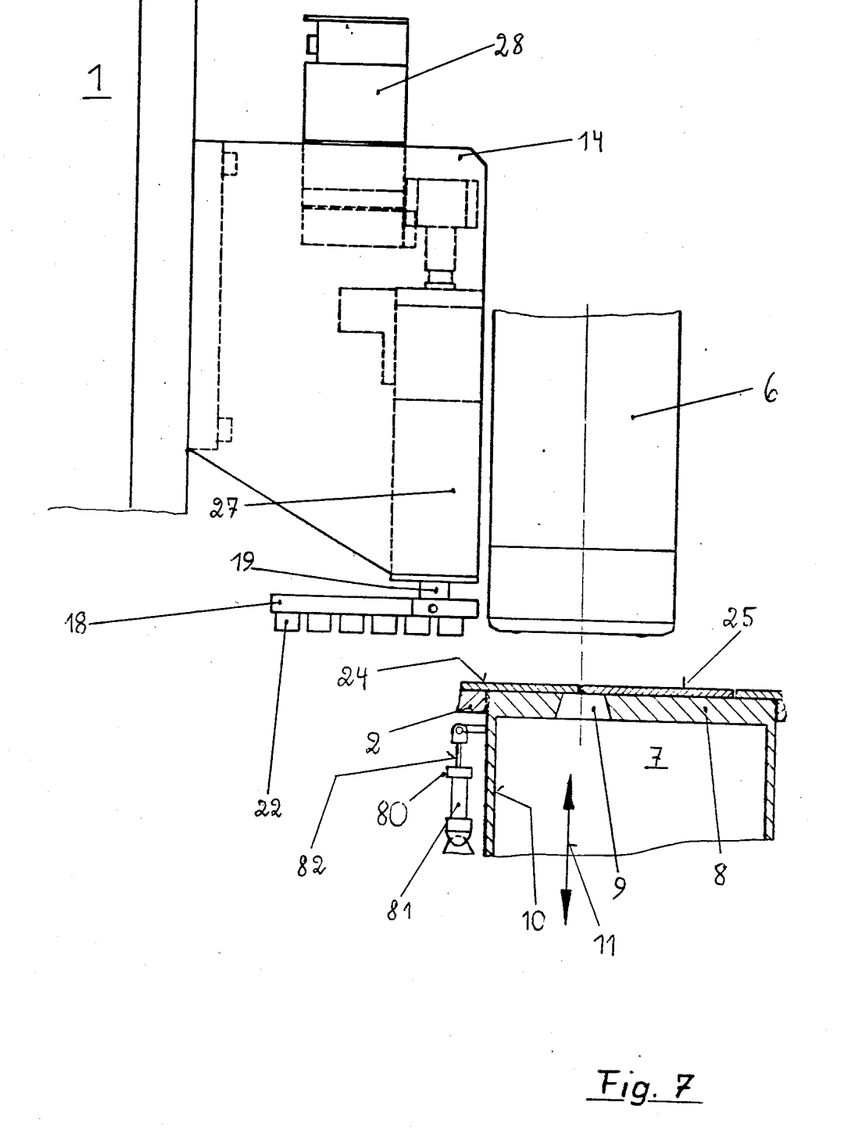
FIG. 7 is a side view of the extracting device with a drive of a laser shaft.
Figure 8:
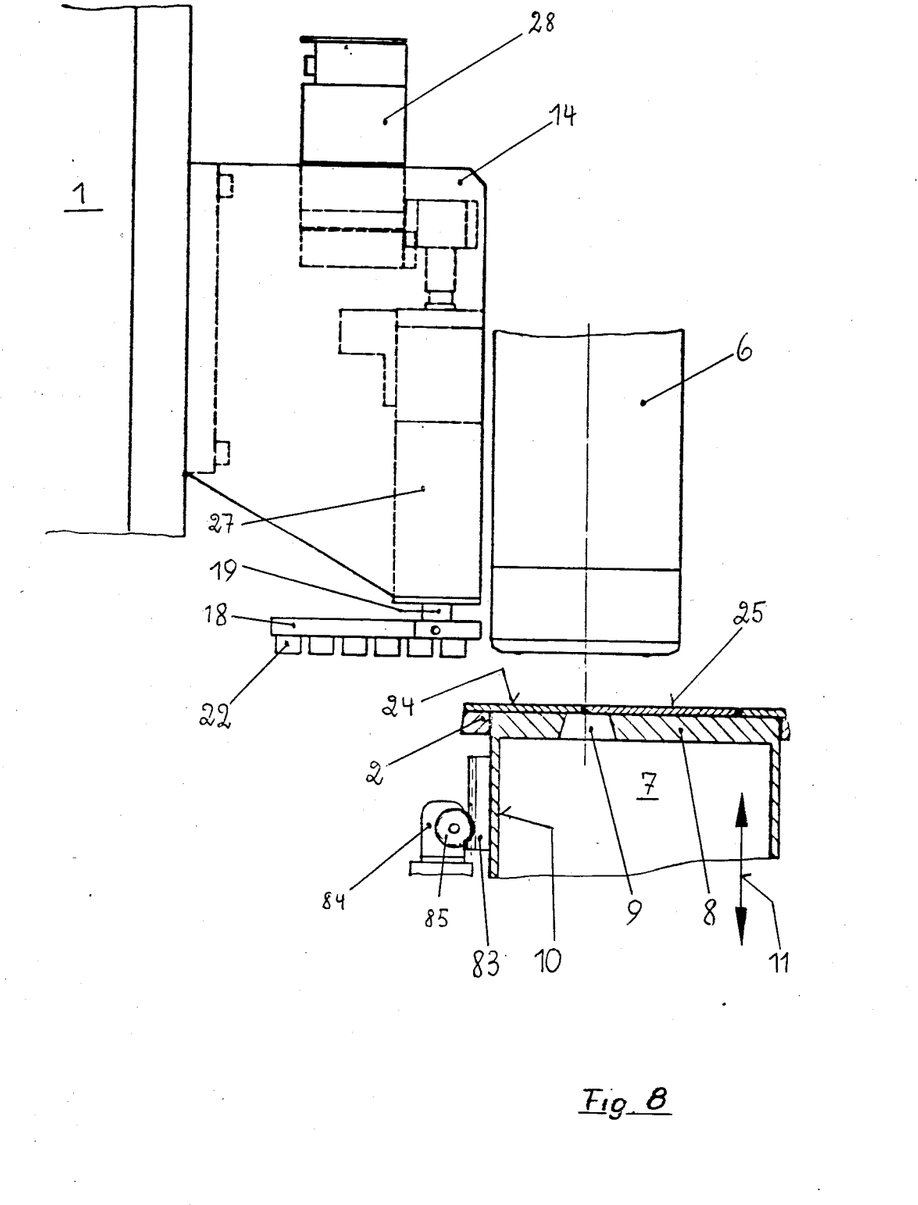
FIG. 8 is a side view of the extracting device in accordance with another embodiment of the drive of the laser shaft.

FIGS. 6–8 show further embodiments of the present invention and use the same reference numerals for those parts which corresponds to the parts of the embodiment of FIGS. 2 and 3.

In FIG. 6 the displacement bodies are formed as wire bristles. These displacement bodies are uniformly distributed over the lower side of the extracting plate 18.

FIGS. 7 and 8 show several embodiments for the drive of the laser shaft 7. FIG. 7 shows a cylinder-piston unit 80 with a stationary cylinder 81 and with a piston rod 82 which is connected with the laser shaft 7. Pressure medium conduits and associated control device for actuating the cylinder-piston unit 80 in one or another directions are not shown in the drawings.

It can be seen that by means of this cylinder-piston unit with the piston rod 82 extending substantially perpendicular to the coordinate table 2, the laser shaft 7 is lowered in direction of the arrow 11 when necessary, so that the part 25 is withdrawn downwardly from the plane of the workpiece 24

FIG. 8 shows another embodiment of the drive of the laser shaft 7. A toothed rod 83 is mounted on one wall 10 of the laser shaft and engages with a toothed gear 85 which is connected with an electric motor 84. The electric motor 84 is stationary and has switchable directions of rotation. It can be seem that by actuation of the electric motor 84, the laser shaft 7 is lowerable from the position shown in the drawings to the position shown under the plane of the coordinate table 2, so that the part 25 can be withdrawn downwardly.

From the preceding description it is believed to be understood that the inventive extracting device has a structurally simple construction, and for pressing out of a cutout part of a workpiece, the workpiece does not have to be moved so that the extracting step can be completed directly after the cutting step.

It will be understood that each of the elements described above, or two or more together, may also find a useful application in other types of constructions differing from the types described above.

While the invention has been illustrated and described as embodied in a cutting press, it is not intended to be limited to the details shown, since various modifications and structural changes may be made without departing in any way from the spirit of the present invention.

Without further analysis, the forgoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters patent is set forth in the appended claims.

1. A cutting press for working plate-shaped workpieces, comprising at least one working station in which a workpiece having a working plane is supported and in which a part of the workpiece is to be cut out; means for cutting out the part of the workpiece; and means for releasing the cutout part of the workpiece from the plane of the workpiece for removing the cutout part from said working station, said releasing means including substantially a structural element which is movable in a working region of said working station in a motorized manner, and shaped to release the cutout part from the workpiece, said structural element being an extracting plate which is shaped for displacing the cutout part from the plane of the workpiece, said extracting plate having a side which is arranged to face the cutout part of the workpiece and is provided at said side with a plurality of displacement bodies composed of an elastic material.

2. A cutting press for working plate-shaped workpieces, comprising at least one working station in which a workpiece having a working plane is supported and in which a part of the workpiece is to be cut out; means for cutting out the part of the workpiece; means for releasing the cutout part of the workpiece from the plane of the workpiece for removing the cutout part from said working station, said releasing means including substantially a structural element which is movable in a working region of said working station in a motorized manner, and shaped to release the cutout part from the workpiece, said structural element being an extracting plate which is shaped for displacing the cutout part from the plane of the workpiece, said extracting plate having a plate plane; and means for supporting said extracting plate and including a rod which extends perpendicularly to said plate plane and supports said extracting plate eccentrically to said rod.

3. A cutting press for working plate-shaped workpieces, comprising at least one working station in which a workpiece having a working plane is supported and in which a part of the workpiece is to be cut out; means for cutting out the part of the workpiece; means for releasing the cutout part of the workpiece from the plane of the workpiece for removing the cutout part from said working station, said releasing means including substantially a structural element which is movable in a working region of said working station in a motorized manner, and shaped to release the cutout part from the workpiece, said structural element being an extracting plate which is shaped for displacing the cutout part from the plane of the workpiece, said extracting plate being lowerable in direction toward the cutout part to be released; a machine table having an opening for withdrawing the cutout part of the workpiece; means for closing said opening of said machine table in a motorized manner; and means for actuating the opening in connection with the lowering of said extracting plate.

4. A cutting press as defined in claim 1, wherein said displacement bodies of said extracting plate are composed of a foam plastic material.

5. A cutting press as defined in claim 1, wherein said displacement bodies of the extracting plate are composed of a rubber-like material.

6. A cutting press as defined in claim 1, wherein displacement bodies of said extracting plate are formed as wire bristles.

7. A cutting press as defined in claim 1; and further comprising a machine table having an opening through which the cutout part of the workpiece can be withdrawn, said releasing means cooperating with said opening of said machine table.

8. A cutting press as defined in claim 1; and further comprising a support for supporting the workpiece and provided with an opening for withdrawing the cutout part of the workpiece, said releasing means cooperating with said opening of said support.

9. A cutting press as defined in claim 1, wherein said structural element for releasing the cutout part from the workpiece is movable between a working position above the cutout part inside the working region and an inoperative position outside the working region, in a motorized manner.

10. A cutting press as defined in claim 9, wherein said structural element for releasing the cutout part from the workpiece is movable to the inoperative position located laterally and above the working region.

11. A cutting press as defined in claim 10, wherein the structural element for releasing the cutout part from the workpiece is movable to the inoperative position above the plane of the workpiece.

12. A cutting press for working plate-shaped workpieces, comprising at least one working station in which a workpiece having a working plane is supported and in which a part of the workpiece is to be cut out; means for cutting out the part of the workpiece; and means for releasing the cutout part of the workpiece from the plane of the workpiece for removing the cutout part from said working station, said releasing means including substantially a structural element which is movable in a working region of said working station in a motorized manner, and shaped to release the cutout part from the workpiece, said structural element being an extracting plate which is shaped for displacing the cutout part from the plane of the workpiece, said extracting plate being lowerable in direction toward the cutout part to be released; a support for the workpiece having an opening for withdrawing the cutout part of the workpiece; means for closing said opening of said support for the workpiece in a motorized manner; and means for actuating the opening in connection with the lowering of said extracting plate.

13. A cutting press as defined in claim 2; and further comprising means for displacing said rod together with said extracting plate, said displacing means including means for vertically moving said rod and means for rotating said rod about its axis.

14. A cutting press as defined in claim 13; and further comprising a base frame, said rod being mounted on said base frame in a vertically movable and rotatable manner.

15. A cutting press as defined in claim 13, wherein said means for vertically moving said rod includes a vertically operating lifting drive, said means for rotating said rod including a rotary drive, said lifting drive and rotary drive being in operative connection with said rod.

16. A cutting press as defined in claim 15, wherein said lifting drive includes a lifting cylinder-piston unit with a piston connected with said rod, said rotary drive having a rotary cylinder-piston unit with which said rod is in operative connection.

17. A cutting press as defined in claim 16; and further comprising a base frame, said lifting cylinder-piston unit and said rotary cylinder-piston unit being mounted on said base frame.

18. A cutting press as defined in claim 16, wherein said lifting cylinder-piston unit and said rotary cylinder-piston unit have driving components which operate in a reversible driving direction.

19. A cutting press as defined in calim 3, wherein said means for activating the opening is mechanically operating means.

20. A cutting press as defined in claim 3, wherein said means for actuating the opening is electrically operating means.

21. A cutting press as defined in claim 3, wherein said means for actuating the opening is pneumatically operating means.

22. A cutting press as defined in claim 3, wherein said means for actuating the opening is hydraulically operating means.

23. A cutting press as defined in claim 13; and further comprising means for arresting said rod in a fixed vertical position during its vertical movement, said arresting means being connected with said rotating means so that the rotation of said rod can be performed only in said fixed vertical position.

24. A cutting press as defined in claim 23, wherein said rotating means include a shaft and is operative for a limited rotation; and further comprising means for limiting the rotation of said rod and including switching elements and switching devices which cooperate with said switching elements and are in operative connection with said arresting means, said switching elements being formed as abutment arms arranged on said shaft of said rotary means.

25. A cutting press as defined in claim 23, wherein said arresting means includes a groove provided in said rod and a cylinder-piston unit cooperating with said groove.

26. A cutting press as defined in claim 13, wherein said rotating means includes a toothed segment and a pinion arranged on said rod and engaging with said toothed segment.

27. A cutting press as defined in claim 13, wherein said releasing means is formed so that said extracting plate rotates in a plane which extends through said intermediate chamber.

28. A cutting press as defined in claim 13, wherein said releasing means is arranged so that said extracting plate rotates in a plane which extends through said intermediate chamber.

29. A cutting press for working plate-shaped workpieces, comprising at least one working station in which a workpiece having a working plane is supported and in which a part of the workpiece is to be cut out; means for cutting out the part of the workpiece; and means for releasing the cutout part of the workpiece from the plane of the workpiece for removing the cutout part from said working station, said releasing means including substantially a structural element which is movable in a working region of said working station in a motorized manner, and shaped to release the cutout part from the workpiece, said structural element being an extracting plate which is shaped for displacing the cutout part from the plane of the workpiece, said working station being formed as a laser station including a laser head and a laser shaft forming an intermediate space therebetween, said extracting plate being movable in said intermediate space between said laser head and said laser shaft of said laser station, said laser shaft having a closing surface with an edge which defines an opening, said laser shaft being lowerable in a motorized manner for releasing said opening.

30. A cutting press as defined in claim 29; and further comprising a machine table which has an opening formed by said opening of said laser shaft.

31. A cutting press as defined in claim 29; and further comprising a support for supporting the workpiece and provided with an opening which is formed by said opening of said laser shaft.

32. A cutting press as defined in claim 1, wherein said releasing means is provided with driving components and arranged together with said driving components relatively near said working station.

* * * * *